United States Patent
Paustian

[11] Patent Number: 6,054,694
[45] Date of Patent: *Apr. 25, 2000

[54] MICROWAVE FACILITATED ATMOSPHERIC ENERGY PROJECTION SYSTEM

[75] Inventor: Philip J. Paustian, Panama City, Fla.

[73] Assignee: Cerberus Institute for Research and Development, Inc., Warner Robins, Ga.

[*] Notice: This patent is subject to a terminal disclaimer.

[21] Appl. No.: 08/834,421

[22] Filed: Apr. 16, 1997

[51] Int. Cl.$^7$ ...................................................... H05B 6/80

[52] U.S. Cl. ........................ 219/679; 219/687; 219/746; 361/117

[58] Field of Search ................................... 219/679, 687, 219/745, 746, 690, 693, 695, 702; 361/117, 118, 119; 333/1; 315/111.01, 111.21, 39

[56] References Cited

U.S. PATENT DOCUMENTS

| | | | |
|---|---|---|---|
| 3,083,528 | 4/1963 | Brown ....................... | 219/687 |
| 3,148,302 | 9/1964 | Clavier et al. . | |
| 3,584,260 | 6/1971 | Barbini . | |
| 4,017,767 | 4/1977 | Ball . | |
| 4,207,452 | 6/1980 | Arai ........................ | 219/687 |
| 4,634,992 | 1/1987 | Brown . | |
| 4,652,694 | 3/1987 | Goldman et al. . | |
| 4,814,720 | 3/1989 | MacPhail et al. . | |
| 5,107,086 | 4/1992 | Yangas ..................... | 219/679 |
| 5,175,664 | 12/1992 | Diels et al. . | |
| 5,206,471 | 4/1993 | Smith ....................... | 219/687 |
| 5,252,178 | 10/1993 | Moslehi ................... | 156/643 |
| 5,471,115 | 11/1995 | Hikosaka .................. | 315/111.21 |
| 5,624,592 | 4/1997 | Paustian ................... | 219/679 |

OTHER PUBLICATIONS

Watkins et al., "A 60 GHz GaAs FET Amplifier", 1983 IEEE MTT's Digest, pp. 145–147, 1983.

*Primary Examiner*—Philip H. Leung
*Attorney, Agent, or Firm*—James Creighton Wray; Meera P. Narasimhan

[57] ABSTRACT

The Atmospheric Energy Projection System (AEPS) projects electrical/thermal energy using microwave radiation at the resonant frequency of oxygen. The radiation excites a column through the ambient atmosphere to a temperature such that air within the column is converted from an insulator to a conducting channel or focused medium. Electrical current is then applied to the channel to transmit an electric charge a predetermined distance. Rapid release of pulses of 60 GHz microwave radiation at a field strength below that for breakdown for the waveguide feeding the antenna or at the antenna aperture creates a channel without premature plasma generation. Once the channel is energized sufficiently, an electric charge is released into the channel and flows down it from the source to a solid the channel intersects. If no solid intrudes the charge diffuses harmlessly at the end of the heated channel as the channel cools back to the ambient temperature. Channel duration is a function of cross-sectional area, and channel length is a function of the amount of 60 GHz microwave energy radiated into the volume of interest. Radiated energy to make the channel is a function of the power available and microwave source used. Shorter ranges require less power to create the channel. Amount of electrical charge released depends on desired range and amount of energy needed at the end of the channel. Arrays of antennas are positioned around a central electrode. Multiple arrays of antennas and electrodes are positioned around a space forming a secure transmission area.

38 Claims, 16 Drawing Sheets

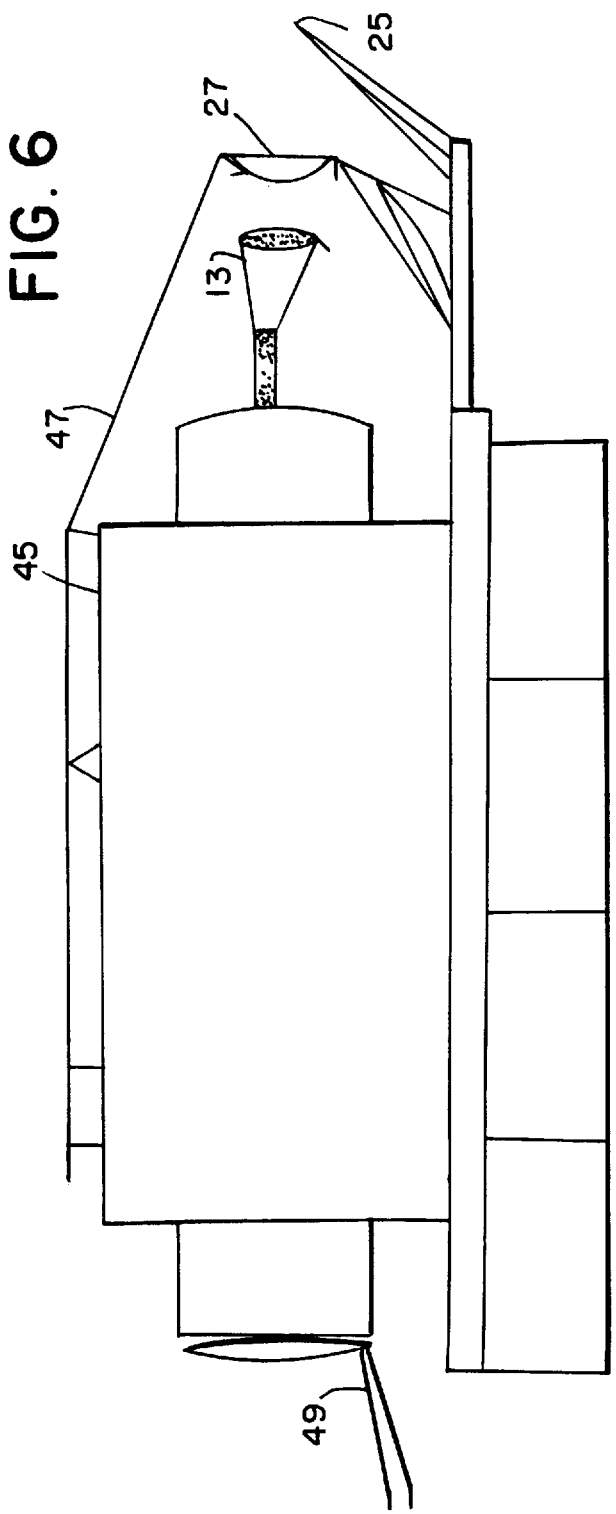
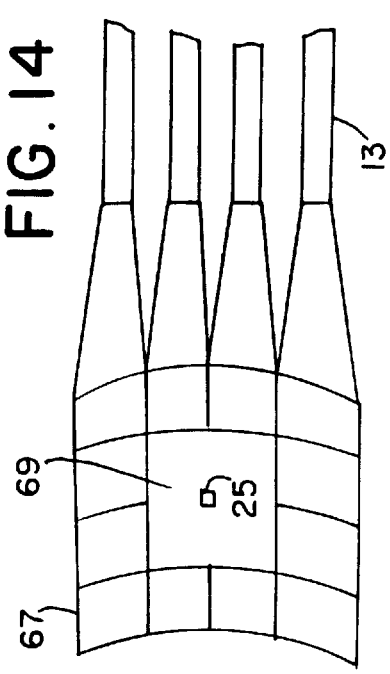
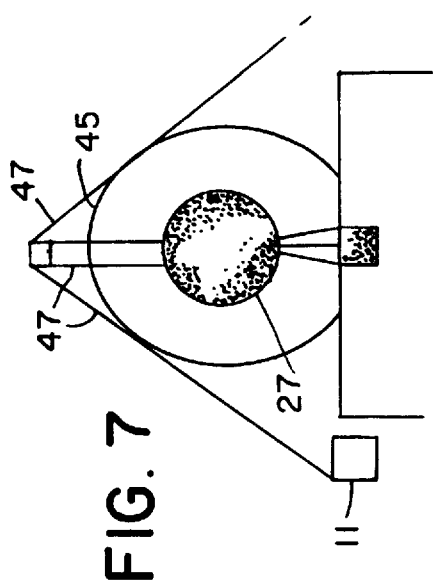

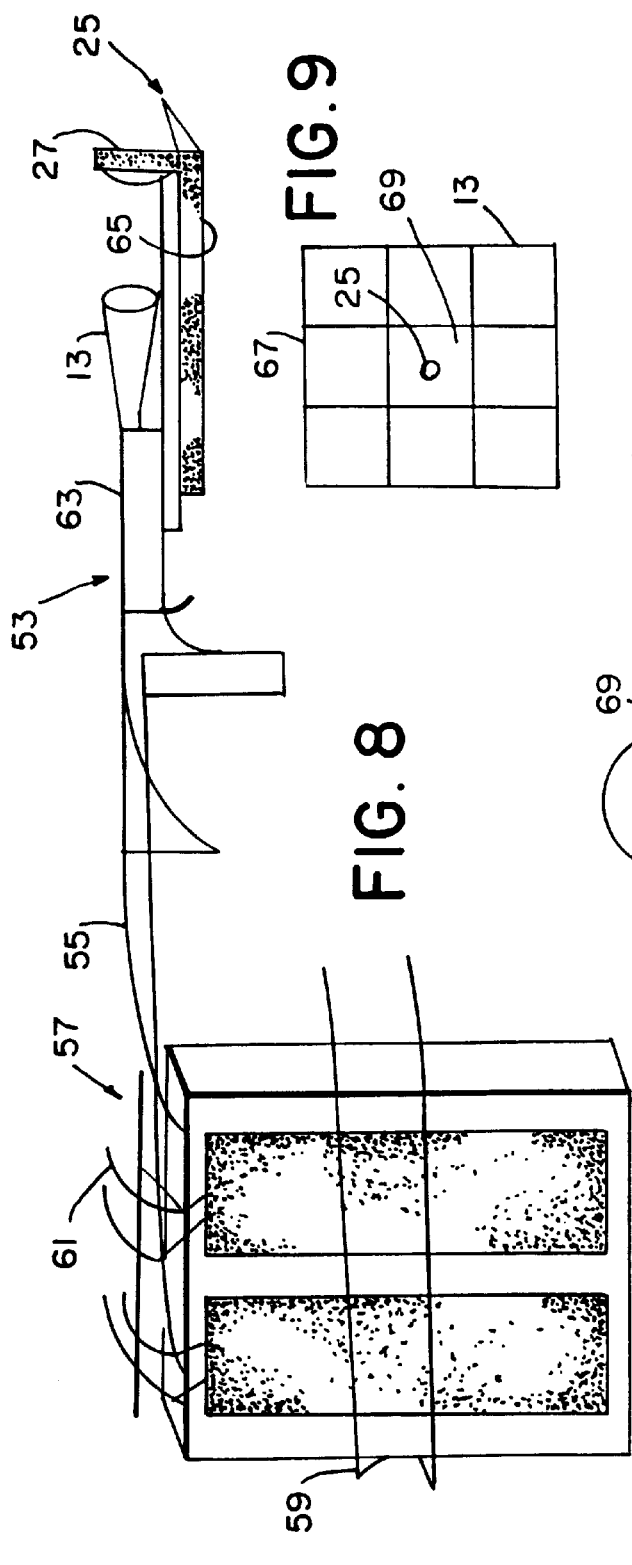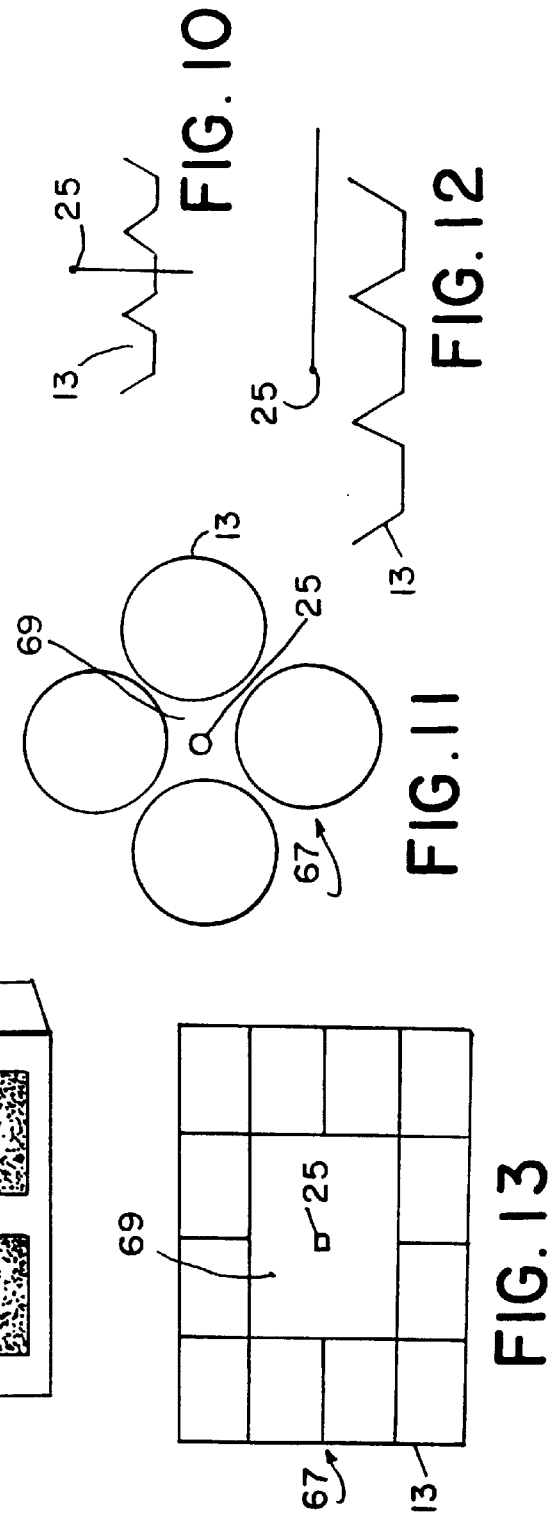

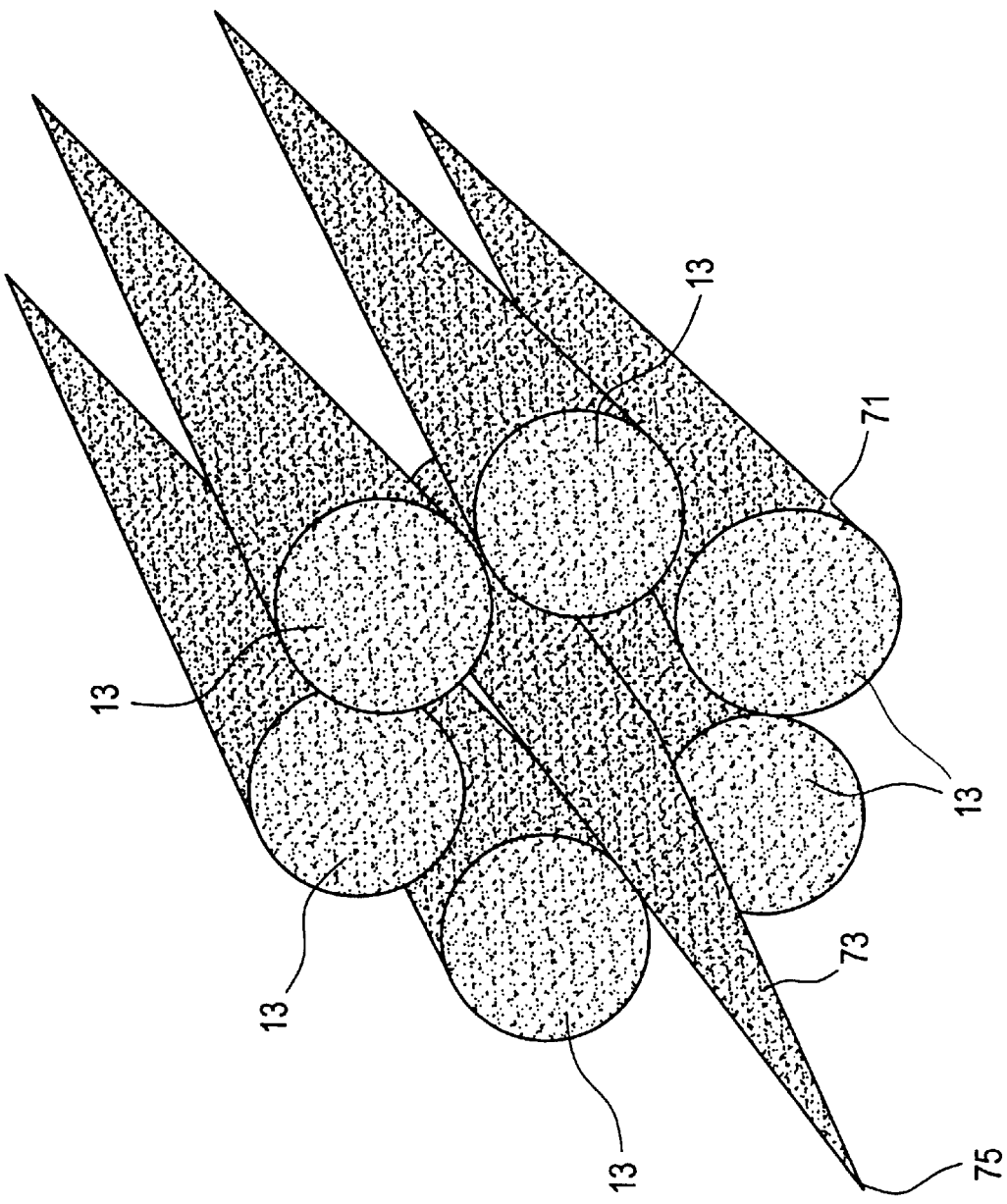

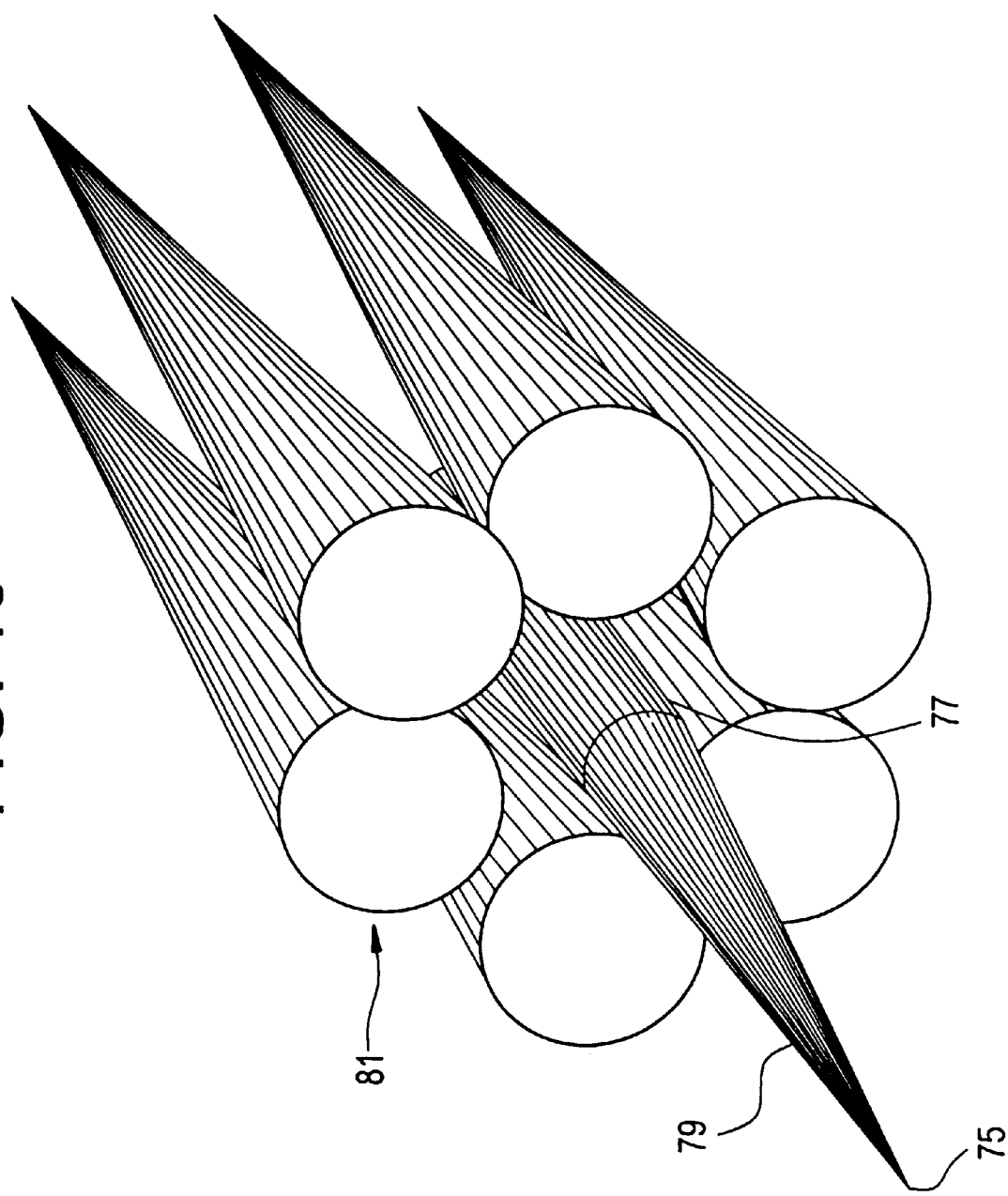

MICROWAVE FACILITATED ATMOSPHERIC ENERGY PROJECTION SYSTEM

BACKGROUND OF THE INVENTION

The present invention relates to a system for projecting thermal and electrical energy that has numerous applications.

Hand-operated devices for crowd control and criminal apprehension have limited range. "Stun guns" are only effective against aggressors in close contact with a victim. Police batons and other devices used by officers require proximity to the criminal. Security fences for containing crowds and subduing rioters must be manually positioned and are not capable of mobile operation. Needs exist for law enforcement devices and systems having long range, quick action and mobile operation.

Military operations are easily frustrated by complex radar systems. Offensive efforts to destroy or inactivate enemy weapons and systems are intercepted and defeated. Needs exist for military devices and systems capable of high speed delivery that will not give a defense system time to detect and respond.

Agricultural activities, such as cattle herding, are highly inefficient. The number of cattle a single herder can handle is limited. Cattle tend to wander outside of a herder's reach and predators quickly attack herds before the herder can react. Devices that permit remote operation would increase efficiency, as more cattle could be handled by a single herder as a greater area of control and protection is established.

Needs exist for means of preventing catastrophes resulting from lightning. Facilities sensitive to lightning strikes need systems that not only detect potential storms but also channel the lightning from the atmosphere to a safe location for discharge.

Protection systems for homes and offices provide adequate detection of intruders but do not assist in trespasser apprehension. A means for temporarily disabling an intruder would increase the number of intruders apprehended and decrease the time needed to apprehend the criminal.

Needs have long existed for perfect communication channels having zero interference and invulnerability to interception.

SUMMARY OF THE INVENTION

The present invention relates to an Atmospheric Energy Projection System for projecting electrical and thermal energy. The system takes advantage of oxygen's resonant frequency for absorption of energy. MFAEPS uses microwave radiation at 60 GHz to create a narrow channel of excited molecules heated sufficiently such that a charge released into that excited air column tends to follow the column rather than dissipating more diffusely into the ambient air. That frequency is the resonant frequency of oxygen. Transmitting 60 GHz microwaves into a narrow air column increases energy in gas molecules in just that portion of the air. Electron mobility in the gas energized by the microwave beam increases, thus favoring the flow of current down the narrow column or channel rather than through the surrounding cooler air. MFAEPS first excites the gas almost to the air breakdown level, and then introduces electric charge into the channel. That creates controlled breakdown with the flow of electrons proceeding down the channel at a speed approaching one-fifth the speed of light or slightly better.

The electric charge continues down the channel until it contacts the object of interest. If no solid encroaches in the column, the electric charge diffuses harmlessly.

MFAEPS has numerous potential applications in a variety of fields, including its development into devices used in military operations. At high power, MFAEPS delivers hundreds of amps of current to land, water, or airborne targets, thereby confusing and immobilizing advanced technology. The electric charge delivered using MFAEPS's travels at one-fifth the speed of light, making evasion difficult. Ground forces can use MFAEPS for destroying or inactivating controlled directed electronic counter measures (ECM). At low powers, the present invention can be used to perform agricultural activities, such as herding livestock. MFAEPS's, having a longer range than a cattle prod, allow one ranch hand to more efficiently control a herd. Devices can also be developed to defend grazing cattle and sheep against predators. Properly tuned, an MFAEPS mechanism merely stings or stuns the predator and thus avoids killing an endangered species or domestic animal.

An array of MFAEPS sources can be used to fence off areas from human or animal passage. That fence is visible as streaks of lightning passing between the two MFAEPS sources. The amount of charge carried by the fence is adjustable so as to merely stun or mildly shock an imprudent observer who chooses to proceed through the fence. The requisite charge is realized by applying enough voltage to achieve breakdown in the air in the channels that would be reformed rapidly. Multiple channels a few centimeters apart created by an array of 60 GHz microwave sources and charge sources aligned in a column an radiating in the same plane creates such a barrier. Similarly, high security-areas can be equipped with MFAEPS's in doorways and hallways to instantly create a barrier to human, animal or automated system passage. The current is adjustable upwards from mild pain to a power sufficient to stun a man or animal, leaving the interloper temporarily unconscious or disabled. MFAEPS's can also be incorporated into home security systems to augment home defenses against unwanted intruders.

In the field of law enforcement, the present invention can be used by police officers to stun and subdue rioters and criminals without inflicting lasting injury. MFAEPS is far more directional, easier to control, less toxic and environmentally safer than tear gas, the weapon commonly employed in those situations. Mounting a column of MFAEPS's on trucks creates a mobile curtain of charge between the trucks themselves and buildings along the street, compelling rioters to move along or be shocked.

Focusing MFAEPS on thunder clouds creates a predictable discharge pathway for lightning. Lightning is directed down the channel to a safe ground or to appropriate storage devices, such as banks of capacitors, batteries, or water directly heated to steam to move a turbine to regenerate electricity in a controlled fashion. Airports, chemical plants, NASA launch facilities and other structures at risk from catastrophic damage from lightning strikes can use MFAEPS's to predictably discharge storms.

For secured communications, a communication corridor can be established by a ring of parallel MFAEPS channels creating a continuous zone of breakdown that surrounds an unexcited normal air core. In the calm unexcited air corridor a communication carrier such as a radio wave, microwave, laser or emitter pulse is established. Perfect communication having zero interference and freedom from interception results from absorption and reflection of the signal by the air breakdown occurring parallel to the signal path. Thus observers outside the core may observe the breakdown path but the signal within the calm core is encapsulated and hidden from them.

Further, efforts to read the beam by interposing another beam and interpreting interference patterns is also futile due to absorption and reflection similar to what occurs when microwaves routinely reflect off the ionosphere. Additional signal security is obtained at the receiving end as the air core is oscillated slightly with coded instructions for matching oscillations by the reception unit.

The present invention is a multiple antenna element with single or multiple electrode version of MFAEPS. For this architecture multiple uniform antenna elements (slotted waveguide antennas, microstrip antennas, fiber optics appropriately doped to conduct 60 GHz, horn antennas, lenses or leaky waveguide antennas) are used in phased arrays to concentrate projected microwave energy centrally or using phase shifters to electronically direct the main beam off axis toward one or another targets. For arrays producing a centrally directed beam a central electrode is used to release charge to the excited zone of air created by the main beam and, as in single antenna MFAEPS, the charge follows the path of the main beam. For the phased array that is scanning electronically, electrodes are located around the periphery of the array face and projecting outward beyond it. The electrode to release current from is selected based on which electrode can couple most effectively to the beam that is directed at a given target. Alternatively the central electrode can be gimbaled to shift or tilt to follow the direction to which the central lobe is steered.

In a second form of Multiple Antenna Element Microwave Facilitated Atmospheric Energy Projection System multiple beams overlap in space but not simultaneously, i.e. not as a phased array. Instead a ring of horn antennas for example will surround a central electrode and will all be focused for the same target such that their diverging beams overlap soon after leaving the horn aperture. These horns will fire serially around the ring or fire in a crisscrossing order but with enough nanoseconds between pulses per horn that no destructive interference occurs and the zone immediately beyond the electrode's tip continues to be excited until energy levels reach near breakdown levels at which point the electrode releases charge into the excited air and it travels down the path of least resistance the path of air heated by the overlapping beams.

MFAEPS in all embodiments achieves energy projection via two main mechanisms:

a) That the oxygen molecules excited by the 60 GHz microwave have a greater statistical likelihood to give up an electron than to absorb one since entropy favors the ionization process that gives up electrons to plasma formation and thus favors the ensuing avalanche of electrons known as breakdown;

b) The number of oxygen and nitrogen molecules in the path of the beam has been reduced relative to the surrounding cooler air outside the beam because the hot molecules (the oxygen absorbing 60 GHz microwaves and the Nitrogen molecules that collide with the excited oxygen) move outward from the beam faster than the molecules at lower velocity (those at ambient temperature) outside the beam diffuse inward. Charge is released about 1 to 10 nanoseconds after the end of a microwave pulse to introduce the electrical charge while the energy from the pulse is still influencing molecules that were in the pulse path and are near the electrode tip.

The MFAEPS system in all embodiments differs from laser systems that seek to create a conducting channel by ionizing the atmospheric molecules in the path of the laser beam. MFAEPS seeks to effectively push molecules out of the way of the electric charge it releases and simultaneously make it more likely that molecules in the electron charge cloud's path will be more prone to give up electrons than to absorb them.

The electrode or current emitting source for MFAEPS in single antenna or multiple antenna element embodiments extends outward from the plane of the antennae ends to reduce charge after release merely jumping the gap and traveling back to the source of the microwave beam rather than onward to the target.

These and further and other objects and features of the invention are apparent in the disclosure, which includes the above and ongoing written specifications, with the claims and the drawings.

BRIEF DESCRIPTION OF THE DRAWINGS

FIG. 6 is a side view of a gyroklystron amplifier shielded against the elements with a microwave lens suspended between the horn antenna and the electrode.

FIG. 7 is a frontal view of the system shown in FIG. 6.

FIG. 8 shows an embodiment of the backpack MFAEPS for short range agricultural use.

FIGS. 9 and 10 are schematic plans, front and side views of a series of rectangular horns surrounding a central electrode. These units can in turn be replicated with long axes parallel to surround a central air core that can be used for transmission of signals that cannot be detected by means outside the air-core due to surrounding air breakdown when MFAEPS is operating.

FIGS. 11 and 12 are schematic plans front and side views of a hollow of a hollow circle of parallel conical horns surrounding a central electrode. These units can also be used to create a circumferential barrier of air breakdown around an unexcited central air core for signals to traverse that again cannot be detected by means outside the air-core due to the electromagnetic shielding air-breakdown provides.

FIGS. 13 and 14 are schematic plans front and side views of a series of horns surrounding a central electrode.

FIGS. 15 and 16 show horn antennas around a central electrode.

DETAILED DESCRIPTION OF THE DRAWINGS

Figure 1:
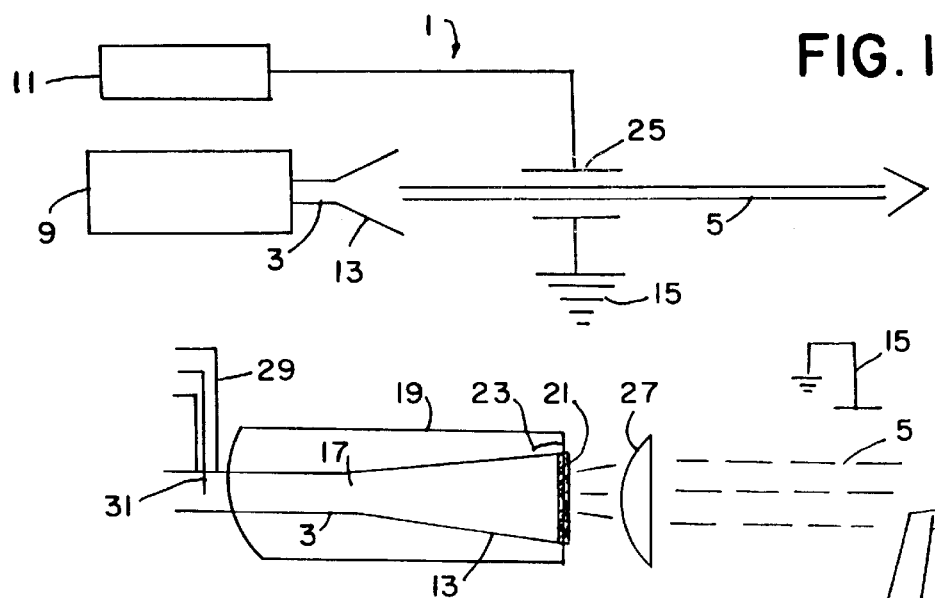
FIG. 1 is a process diagram for the Microwave Atmospheric Energy Projection System.

Referring to the drawings and to FIG. 1, the Microwave Facilitated Atmospheric Energy Projection System (MFAEPS) 1, using microwave radiation at 60 GHz by way of a waveguide 3, takes advantage of oxygen's absorption at oxygen's resonant frequency to create a narrow channel 5 of excited molecules heated to 4000 degrees Kelvin. An electric current is then placed onto the channel 5, and an electric charge is transmitted a predetermined distance along the channel 5.

At 4000 degrees Kelvin dry air has a conductance of about 1 mho/meter. At 2000 degrees Kelvin dry air is an insulator with a conductance of $10^{-6}$ mho/meter. Between 2000 and 4000 degrees Kelvin dry air becomes a fairly good conductor. Upon increasing the energy in the oxygen molecules in the narrow channel 5 of air by transmitting 60 GHz microwaves into the channel 5, electron mobility in the oxygen within the beam increases, thereby favoring the flow of current down the channel 5 rather than through the cooler surrounding air. MFAEPS 1 uses the 60 GHz microwave pulses to excite the oxygen molecules almost to the air breakdown energy level immediately before the electric charge is released into the channel. That creates controlled breakdown with the flow of electrons proceeding down the channel 5 at a speed approaching one fifth the speed of light or slightly better. MFAEPS 1 can either release a charge into the channel 5 at the end of the pulses or during an interval when the system 1 is not pulsing, such as during the 20 to 40 microsecond lull between 50 microsecond pulses.

The excited channel 5 of air takes a finite amount of time to re-equilibrate with the surrounding air. Lightning data demonstrates that a 1 cm radius channel 5 once heated to 4000 degrees Kelvin conducts for 50 milliseconds before heat transfer converts the channel 5 back to an insulator. A larger diameter channel 5 takes longer to decay, but requires more energy to create.

As shown in FIG. 1, preferred embodiments of the invention 1 have a transmitter 9 for generating microwave pulses, an electric charge source 11, a waveguide 3, an antenna 13 and a ground 15.

The microwave can be generated by any of a number of transmitters 9 depending on operational requirements. Multiple gallium arsenide monolithic microwave integrated circuit 60 GHz amplifiers or high electron mobility transistor amplifiers can be coupled to generate the microwave pulses for channel creation for many moderate power applications. For higher power channels one or a small group of 60 GHz Gyrotron tubes such as a gyromonitron oscillator, a gyrotron based traveling wave tube amplifier (GyroTWT), or a gyroklystron amplifier can be used to put out 100 to 120 joules per pulse or better. A large array of 60 GHz Klystron amplifiers or 60 GHz Magnetron amplifiers operating at near their maximum power outputs can also be combined to supply higher power microwave pulses for longer ranges.

The selection of source 11 of electric discharge for keeping the channel 5 open and for providing a current source is dependent on the predetermined distance of current source is dependent on the predetermined distance of current travel and projected energy delivery. MFAEPS can use modified spark plugs, tesla coils, arc welding nozzles, banks of charged capacitors, or other current source 11 to deliver charge to the channel 5. In one embodiment, a Marx bank is used to release large charges rapidly and predictably. A Marx bank is a bank of capacitors that are charged in parallel and discharged serially.

Power requirements for generating 60 GHz microwaves depend on the desired range, the channel 5 diameter, and the channel 5 temperature discharge. Some estimates are as follows:

| channel radius | channel length | Energy required to create channel of 4000 K air |
| --- | --- | --- |
| 0.01 m | 4 m | 6.48 kilo joules (kJ) |
| 0.01 m | 20 m | 32.4 kJ |
| 0.01 m | 40 m | 64 kJ |
| 0.01 m | 41,284 m | 677,922 kJ |

These energy requirements are based on worst case scenarios modeling the atmosphere as just oxygen and nitrogen and supplying enough microwave energy to the oxygen and neighboring nitrogen molecules to heat all the molecules to 4000 degrees Kelvin. MFAEPS 1 does not require that all energy put into the channel 5 completely constitute microwaves.

Once some gradient is established, electrical discharges along the channel 5 course through the atmosphere through the favored pathway. The discharges, by rapidly flowing in the channel 5, heat the channel 5 and reduce resistance. MFAEPS 1 is more efficient than natural lightning, because the invention creates the channel 5 of excited molecules directly by exciting oxygen at its resonant frequency. That provides a straight path offering a low resistance to current and avoiding the changes in direction normally observed with lightning.

The anticipated range for MFAEPS operating on the ground is from meters to 41 kilometers. With sufficient energy from an airborne source, that range can be further increased. The actual range of the invention is dependent on the power delivered to create the channel, the electrical discharge available to keep the channel 5 open and traveling along the channel, and the channel 5 radius required for carrying the desired current. Lightning data demonstrates that a 1 cm radius channel 5 easily can carry a current of 100 Amps.

Figure 2:
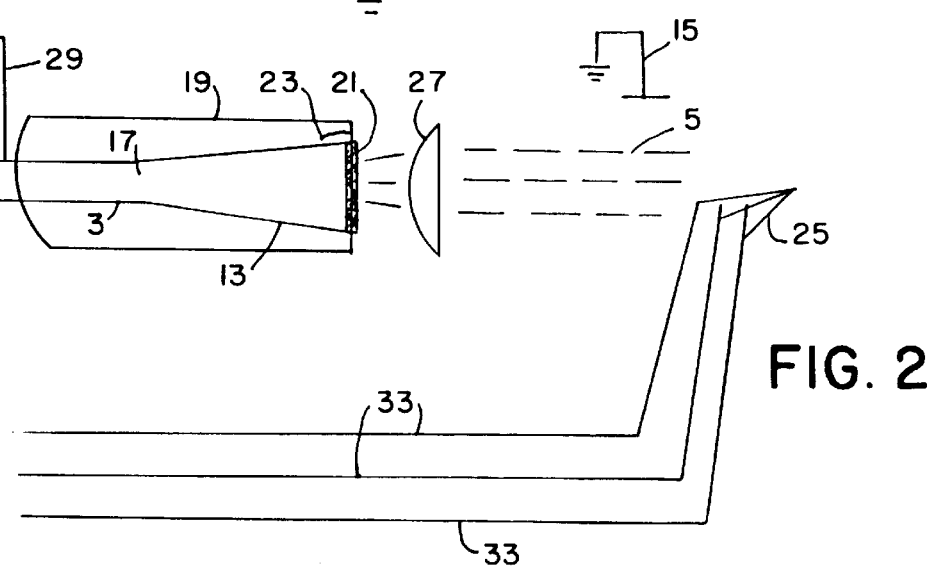
FIG. 2 is a more detailed diagram of the system showing a waveguide, a horn antenna, a microwave lens and an electrode.

FIG. 2 shows a preferred embodiment of the present invention having a waveguide 3 and a conical horn antenna 13 connected to the waveguide 3 at the conical horn apex 17. To increase the energy applied per pulse without breakdown occurring in the waveguide 3, the waveguide 3 and the antenna 13 assembly are filled with a more inert gas such as $N_2$ or $SF_6$, at pressures greater than atmospheric pressure. The waveguide 3 is pressurized to allow higher power pulses for more rapid channel 5 construction and longer range. When a conical horn antenna 13 having an aperture of 4.048 cm is used, 120 joules can be expended over 6.32 microseconds, which is equivalent to 19 MW. Sealing the system 1 and pressurizing the waveguide 3 with inert gases increases pulse power handling capability but higher power will increase heat production resulting in a need for external cooling. In one embodiment a cooling jacket 19 for water cooling is fitted around the waveguide and conical horn antenna 13, as shown on FIG. 2. The embodiment of the system 1 shown in FIG. 2 has a transparent window 21 positioned on the outer edge or aperture 23 of the conical horn antenna 13. A microwave lens 27 positioned between an electrode 25 and the conical horn antenna 13 reduces divergence of the channel 5. A first set 29 of coaxial cables extends from a transmitter 9 to an antenna probe 31 in the waveguide 3. A second set of 33 of coaxial cables extends from the electrical charge source 11 to an electrode 25 positioned in the channel 5. The lens 27 can be rotatable for altering charge transmission.

Figure 3:
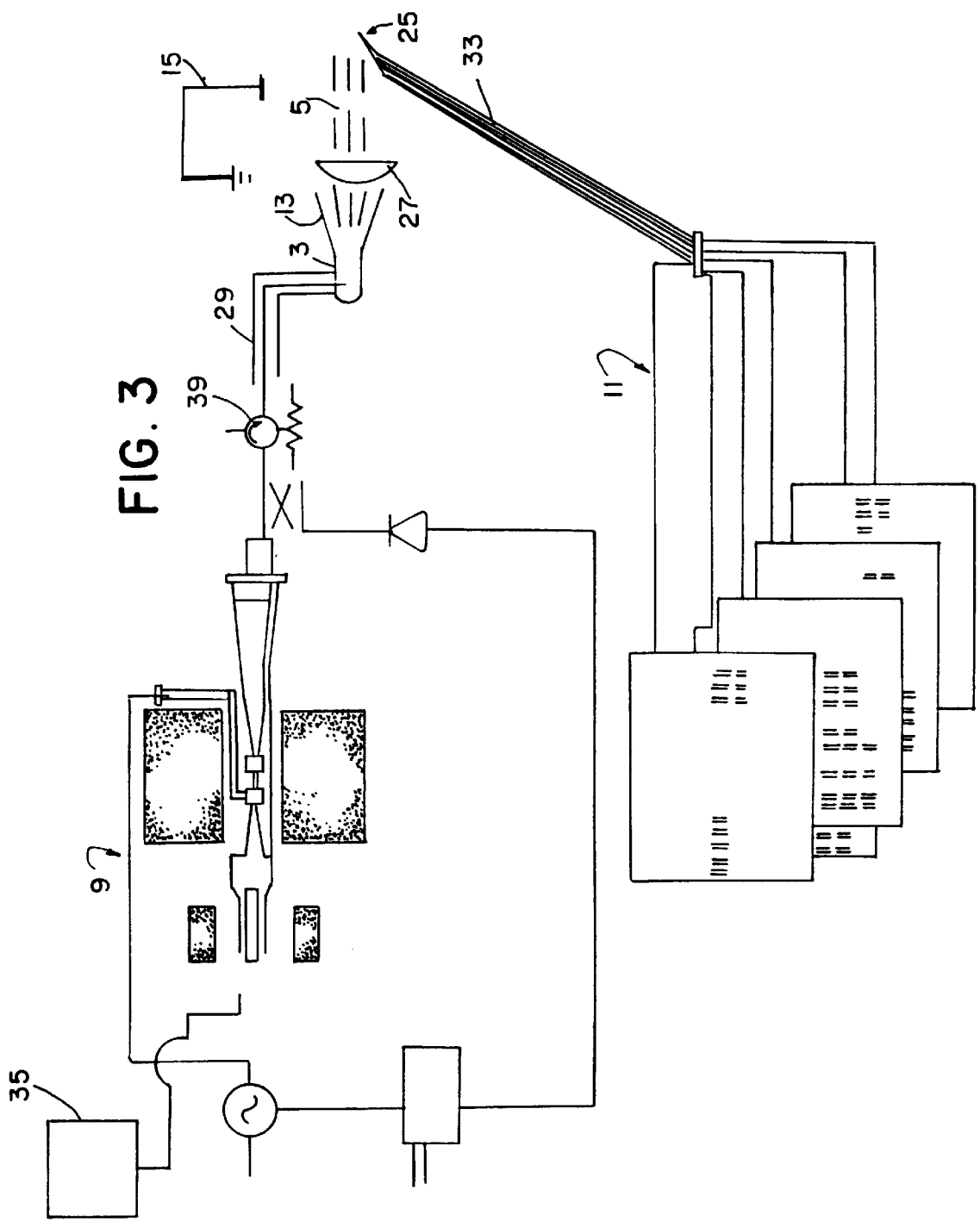
FIG. 3 is a preferred embodiment of the system having a gyroklystron amplifier for generating the microwave pulses for channel creation.

FIG. 3 shows MFAEPS 1 having a Gyrotron as the transmitter 9. In that embodiment, the Gryotron is a Gyroklystron. Other Gyrotrons, like GyroTWT and Gyromonitron, can be substituted. The Gyrotron, which is connected to a power supply 35, generates and transmits microwave pulses to a waveguide 3 through the first set 29 of cables. The pulses propagate through a microwave lens 27. The lens 27 reduces divergence, resulting in a narrow pulsed 60 GHz microwave beam channel 5. A release electrode 25 that is connected to a charge source is positioned on the beam channel 5. The embodiment of the invention 1 shown in FIG. 3 has a Marx bank of capacitors as the charge source 11. Once sufficient energy has been applied to the channel 5 to create the channel 5 with the desired distance, charge is released into the channel 5 by the Marx Banks. A ground plate 15 is located close to the channel 5 to provide a path for a released charge, should the channel 5 not be present when the charge is released. In that situation, the charge jumps from the releasing electrode 25 to the ground plate 15 and spares challenge to the circulator 39 in the transmitter 9.

Figure 4:
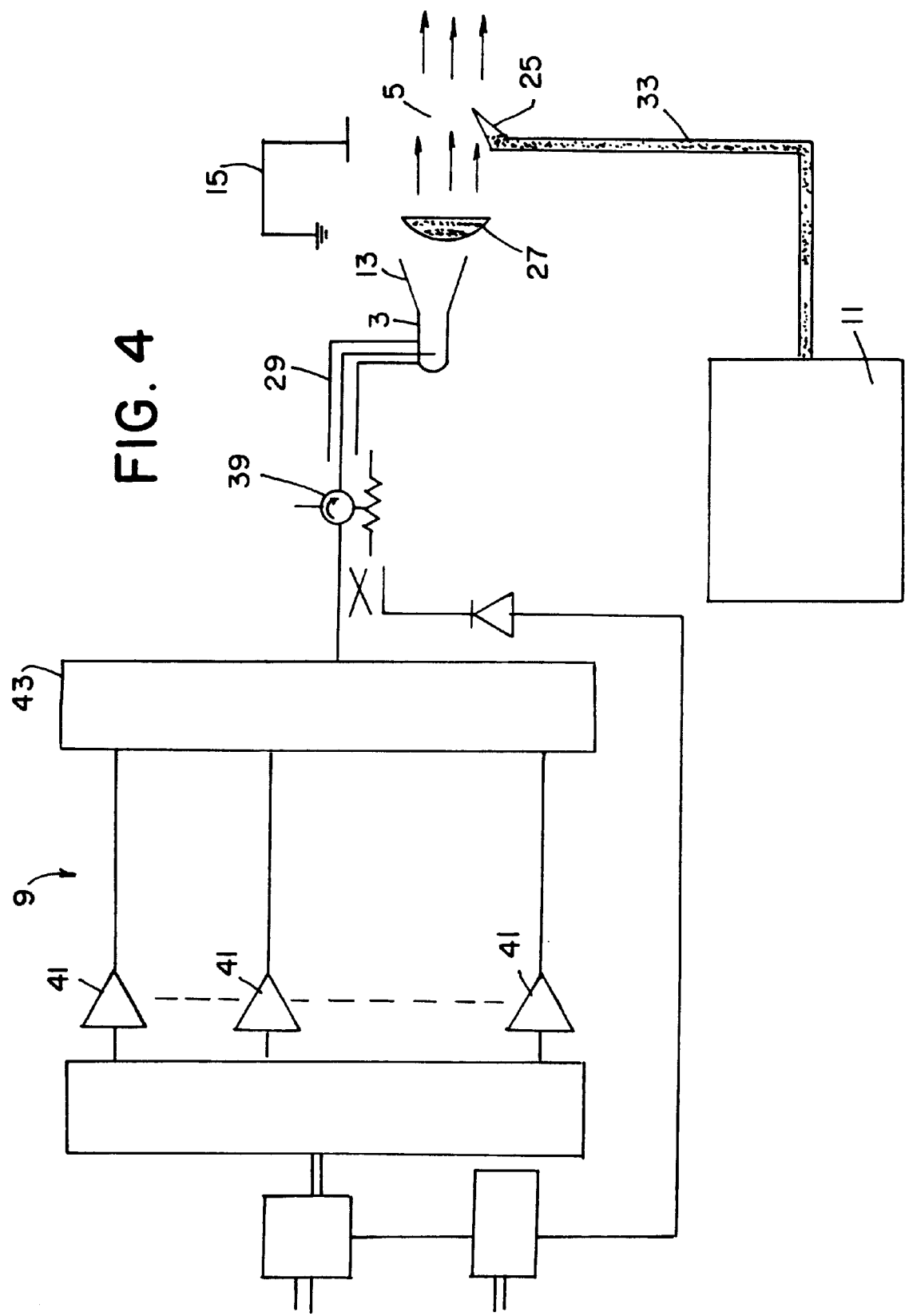
FIG. 4 is a preferred embodiment of the system having multiple 60 GHz solid-state amplifiers for generating the microwave pulses for channel creation.

The transmitter 9 can be solid state microwave amplifiers, as shown in FIG. 4, rather than tube based sources. Multiple solid state 60 GHz amplifiers 41, like gallium arsenide microwave monolithic integrated circuit amplifiers and high electron mobility transistor amplifiers, can be combined to achieve necessary power output. The output from each amplifier 41 is merged in a combiner 43 and is delivered to the waveguide 3.

Figure 5:
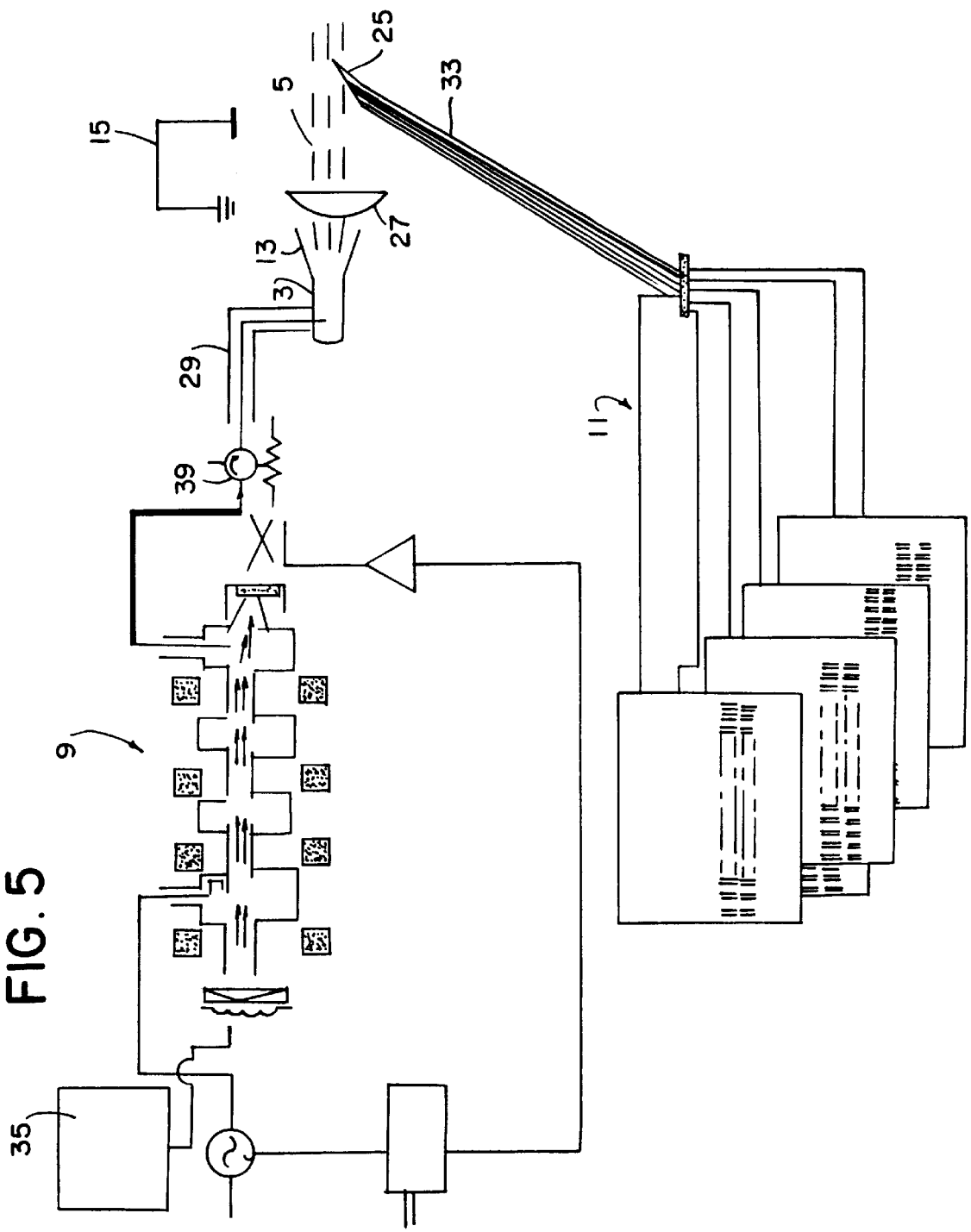
FIG. 5 is a preferred embodiment of the system having a multi-cavity 60 GHz Klystron amplifier for generating the microwave pulses for channel creation.

FIG. 5 shows another preferred embodiment of the system 1 having a 60 GHz Klystron as the transmitter 9.

In FIGS. 6 and 7, the transmitter 9 and waveguide 3 are shielded from the surrounding environment. The conical horn antenna 13 extends outward from the side of a shield 45 and is connected to the waveguide 3. A lens 27 for focusing the beam is suspended in front of the horn antenna 13 by struts 47 or other supporting means connected to the shield 45. A cable 49 extends from the end of the shield 45 and is connected to the power supply 35.

A utilitarian design for MFAEPS 1 is shown in FIG. 8. One embodiment of the backpack MFAEPS unit 53 has flexible coaxial cables 55 leading power from a battery pack 57 to the transmitter 9 and conducting a charge from charge source 11. A second embodiment has an arrangement of induction coils running off the batter pack for providing a low current but high voltage charge to travel along the short-range channel 5 that is created. The battery pack 57 of the backpack MFAEPS unit 53 has a harness 59 and straps 61 for body attachment. The waveguide 3 is positioned inside a casing 63 to which the battery pack 57 is connected. The conical horn antenna 13 extends out of the casing 63. When a lower energy beam channel 5 is required, the lens 27 can be flipped down, allowing for a more divergent beam and reducing channel 5 effectiveness for charge transmission.

For very high power channels for long range applications or fairly short range lower power applications it will be simpler to eliminate the lens and use an array of antenna elements to overlap their beams to create a central beam adequate for channel formation. For close range the cost of the lens is eliminated. For long range eliminating the complexities of keeping the lens cool will prove a good tradeoff for many applications. (see FIG. 9.) Precise curvature of the array face will depend on the range one seeks to focus the channel. For multi-use lensless versions of MFAEPS the curvature of the horn antenna array face can be adjustable.

MFAEPS systems consist of directing microwave pulses and releasing electrical charge. Pressurizing the waveguide and horn assemblies with inert gases increases the energy per pulse that can be transmitted before breakdown occurs within the waveguide, a condition that obviously is to be avoided. The need to increase pulse power is clearly a function of the range to target rather than the application per se, i.e. disabling a target, securing a communication channel, or discharging a thundercloud, whatever the task, the greater the distance the more power is required to condition the channel 5 to deliver the necessary charge (energy) to the destination. The need for a cooling jacket is similarly a function of the range to target and the inherent power required to condition the channel to carry the necessary energy to the target. The cooling jacket is not a function of the purpose for projecting power. To enhance likelihood of success further in the application for discharging lightning in addition to use of he 60 GHz microwaves to prepare a channel 5, electrical charge is released into the channel aimed at the cloud to further reduce resistance and create a predictable cloud to ground channel for conduction. The same process can be carried out from the air and at sufficient altitude that power requirements are lessened since breakdown voltage declines with altitude so the power requirement for channel creation is lessened and a predictable cloud to ground channel is still created.

A preferred embodiment of the process uses an array of microwave horn antennas that surround a central electrode that projects forward beyond their apertures. The microwave pulses from the horn array overlap in the region around and just beyond the electrode, creating a channel or zone of high field intensity into which electrical charge is released. The microwaves interact with the magnetic dipole of oxygen molecules in this zone as they radiate outward. Excited oxygen molecules in the zone have increased velocity and diffuse out of the zone more rapidly than cooler species diffuse inward, non-excited oxygen for example. That reduces the number of molecules in the path that could otherwise absorb the free electrons. Molecules remaining in the path or zone that are excited have an increased chance of contributing an electron to the avalanche of current proceeding through the excited zone rather than just absorbing an electron to become a negative ion. Excited molecules include others than just oxygen molecules because the excited oxygen molecules will collide with the nitrogen, leading to some increased molecular velocity in those species as well. Any heating of the excited zone is a secondary effect of the microwave pulse interacting with oxygen molecules, but it will happen. The zone of overlapping microwave beams that is created by multiple antenna elements obviously does not remain stationary but travels forward at light speed, interacting with more oxygen molecules as it progresses until it is absorbed, attenuated or diverged to the point that it has no measurable effect. The electrons released at the time of the microwave pulse travel in the direction of the pulse, because that is the path of least resistance. Their speed will fall to about one fifth the speed of light. Depending on the task at hand, successive microwave pulses and electrical discharges will follow in rapid succession to deliver energy through the atmosphere for MFAEPS to achieve the desired effect.

The aforementioned preferred embodiment with an array of microwave sources surrounding a central electrode that projects outward beyond their apertures reduces the risk of back propagation of electrical charge to the antennas, because the individual microwave pulses from each antenna would be only ¼th or less of the field strength to create an MFAEPS pulse. In one example individual pulses would be around 8000 volts per centimeter field strength to for an array of four horns, and their main beam would overlap to create a field strength approaching 24000 volts/cm. The approximation allows for the inevitable waste of energy in sidelobes. A preferred pathway for charge to flow from the electrode would be the zone of excited oxygen from the 60 GHz microwave pulses overlapping in front of the electrode. The geometries considered so far use from four to six conical or rectangular horns to create a central zone that is heated some no-matter which horn is firing at that moment and so the that zone is brought close to breakdown and then charge is released by the central electrode into that channel.

No device can work to maximum effectiveness without all the basic components. The only difference between the secured communication application and the lightning controlled discharge to an observer not knowing what the device was for would be the number of components grouped together. Energy requirements for a given application and speed with which it must be carried out would dictate the number of microwave sources required to create an excited zone or channel (s), the number of channels needed and the amount of current or charge released. The physics for all of the potential applications and the basic configuration to carry them out remains the same for all MFAEPS embodiments whether single antenna, multiple antenna, and single or plural electrodes.

A preferred system for projecting energy has plural transmitters for generating microwave radiation pulses and plural antenna for projecting the pulses in channels. Plural electrodes one or more, per channel release charge that combines with the excited gas molecules, creating a region of electrical breakdown that surrounds a central air core available for secure communication. The air core is protected from external electromagnetic interference by the aforementioned channels of breakdown surrounding it.

An array of antennas surround a central source of electrons, electrical charge, electrical current for electrons in motion flowing in a given direction. The MFAEPS communication application diagrams show its units from the front and in perspective. The horn apertures are all in the same plane with the electrodes projecting out beyond the horn apertures.

Multiple MFAEPS modules are used for the communication application. An array of antennas surrounds a central electrode for each module. The waveguides to the horns and schematics for the amplifiers, transmitters and charge sources are not shown in these figures. The electrode 25 is intrinsic to the MFAEPS module. It is not part of the communication core. It does not help communicate. The release of charge is meant to help achieve controlled breakdown down the channels excited by microwaves. The stable central air core will be traversed by a signal protected from outside interference whether natural or electronic countermeasures. The stable central air core is not traversed by free electrons released by the electrodes. FIGS. 3 and 4 make that clear.

Overlapping microwave beams may be used to create the channel. Overlapping beams will be simpler to build but less efficient than a system that avoids the backwards propagation of released charge based on precisely releasing charge in time so that the microwave pulse(s) favor conduction in front of MFAEPS device rather than back toward it.

Conical horns are shown because the corrugated form produces symmetrical electrical and magnetic fields making some preliminary calculations simpler. Sectoral horns or other rectangular horns may be easier to manufacture and may prove useful for given applications. Such changes in horn design or antenna design in general alter beam pattern and potential beam overlap but obviously do not change the physics of the device. Instead of conical horns rectangular or sectoral horns may be used. The electrode also is abstract and its charge source may be replaced by a more energetic electron source than a bank of capacitors such as a Marx bank discharging into an electrode. The Marx bank is useful however and is a commercially available source of both high voltage and high current pulses. But for microwave pulses around it, the electrode would simply emit sparks into the immediate atmosphere, accomplishing nothing.

FIGS. 9–14 illustrate potential pleural antennae MFAEPS geometries with horns 13, electrodes 25 showing rectangular and circular antenna arrays.

FIGS. 15 and 16 show horn antennas 71 surrounding a central electrode 73 with a tip 75. The cylindrical body portion 77 of the electrode 73 and the tapered portion 79 which extends outward from the body 77, are insulated, with the exception of the electrode tip 75. Together the multiple horn antenna 71 and the central electrode form an MFAEPS module 81.

Figure 17:
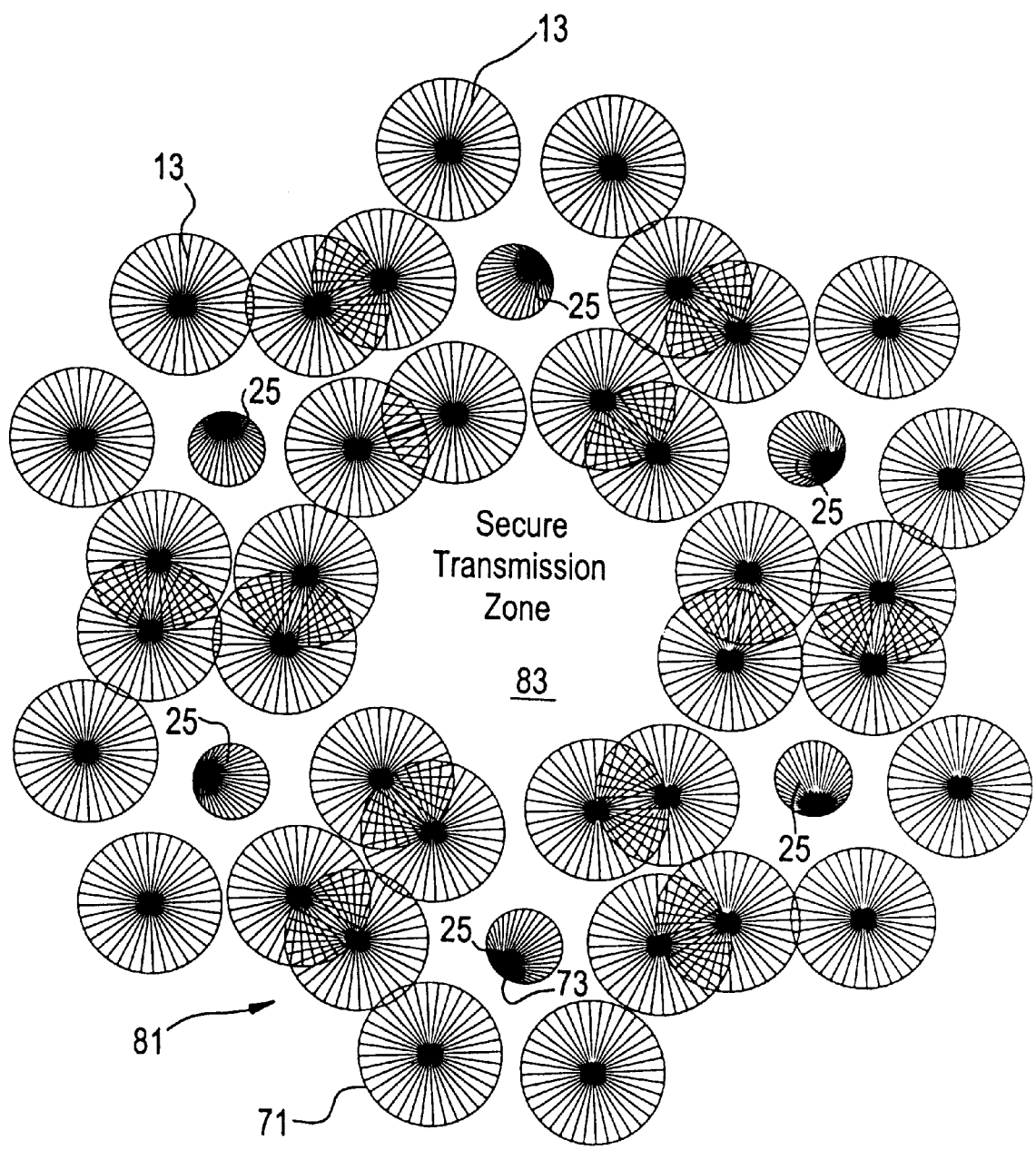
FIGS. 17 and 18 show a secure transmission zone surrounded by multiple MFAEPS modules.
Figure 18:
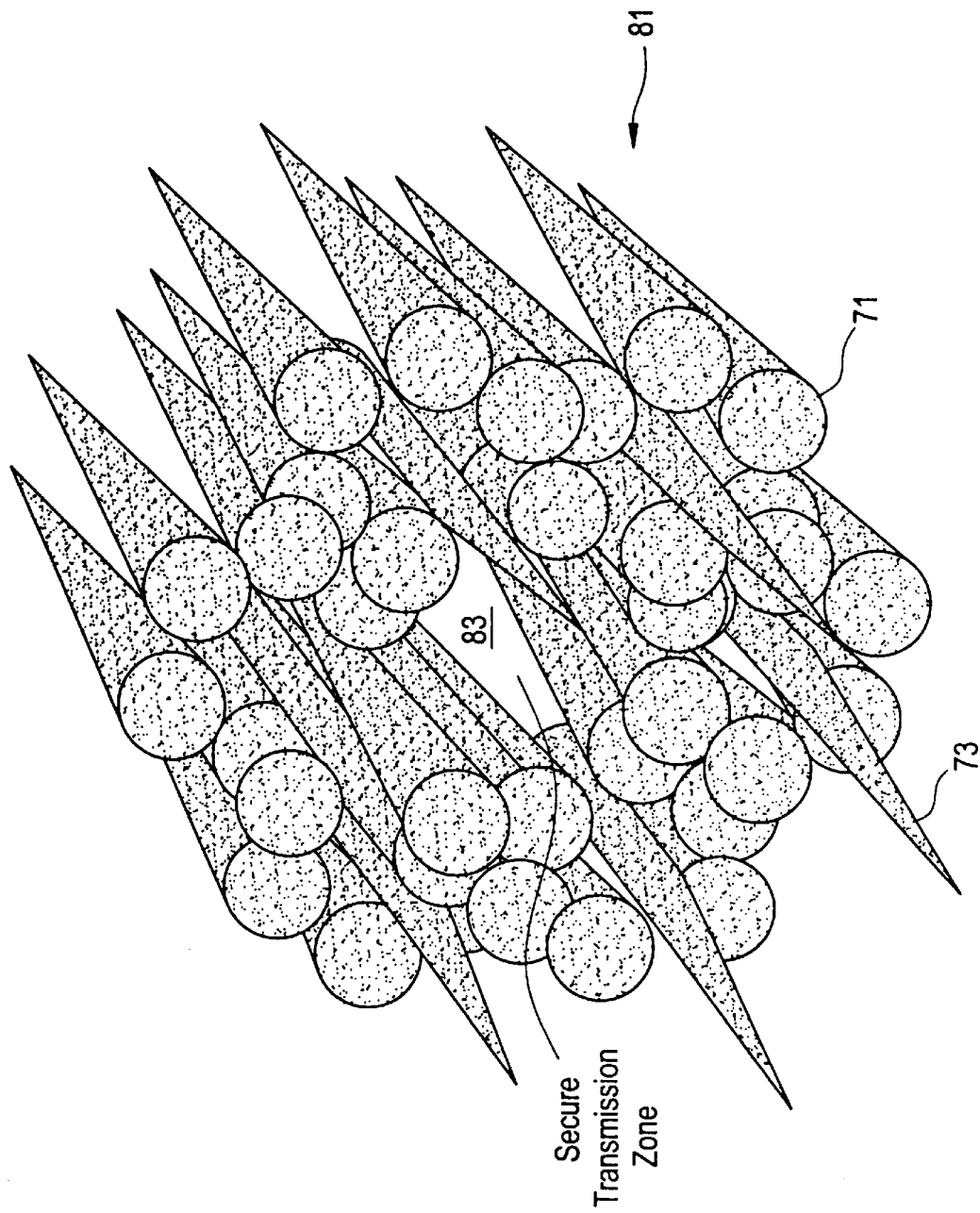

As shown in FIGS. 17 and 18, a secure transmission zone 83 is surrounded by multiple MFAEPS modules 81, each having multiple horn antennas 71 surrounding a central electrode 73.

Figure 19:
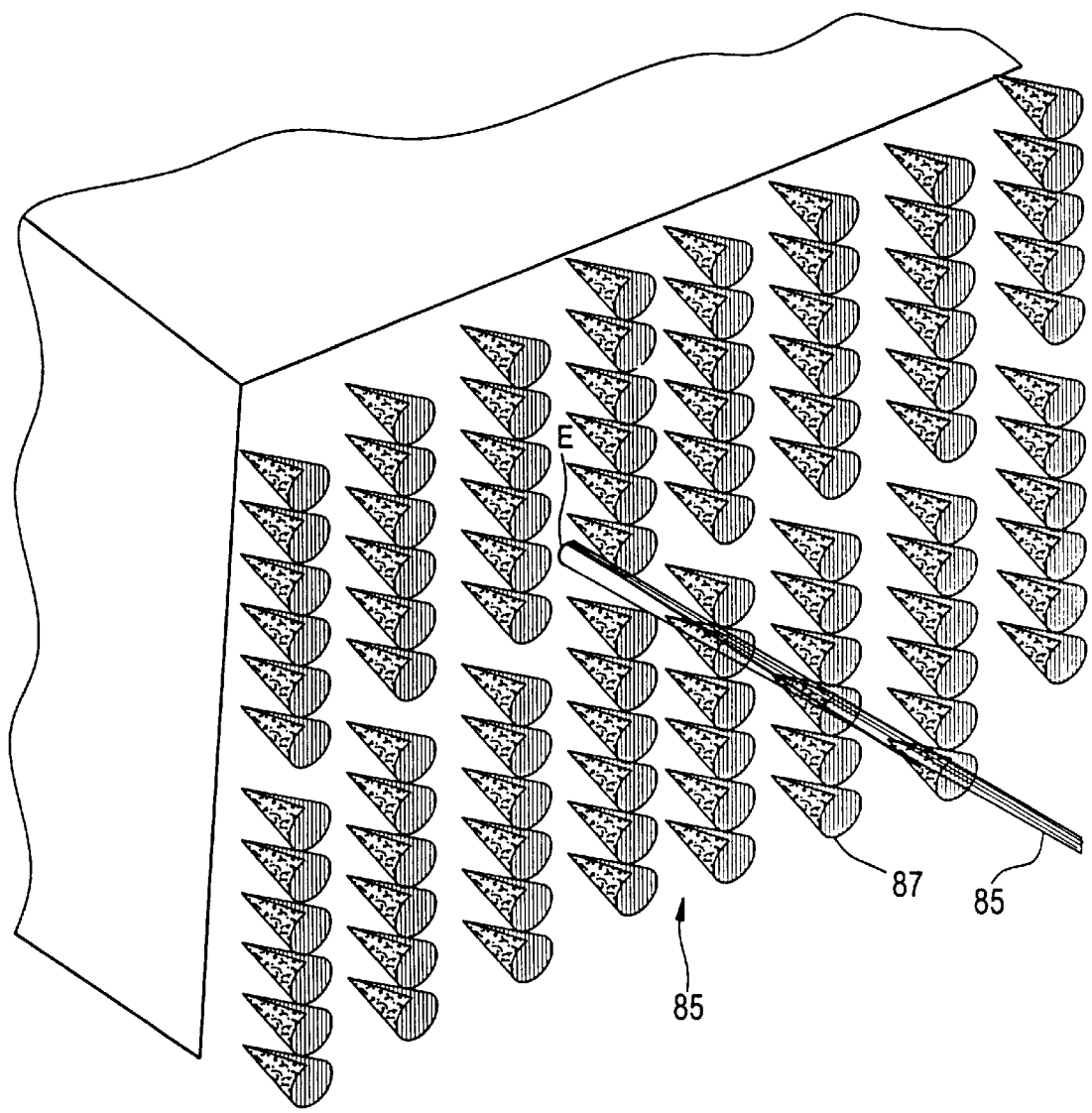
FIG. 19 is a schematic perspective view of an electrode projecting beyond a large arrangement of antenna elements that are horns in this particular case.

FIG. 19 shows a system in which a large array 85 of antenna horns 87 surrounds a single electrode 89. As shown in FIG. 19, horns may be multiple horns may be arranged in rows and columns.

Figure 20:
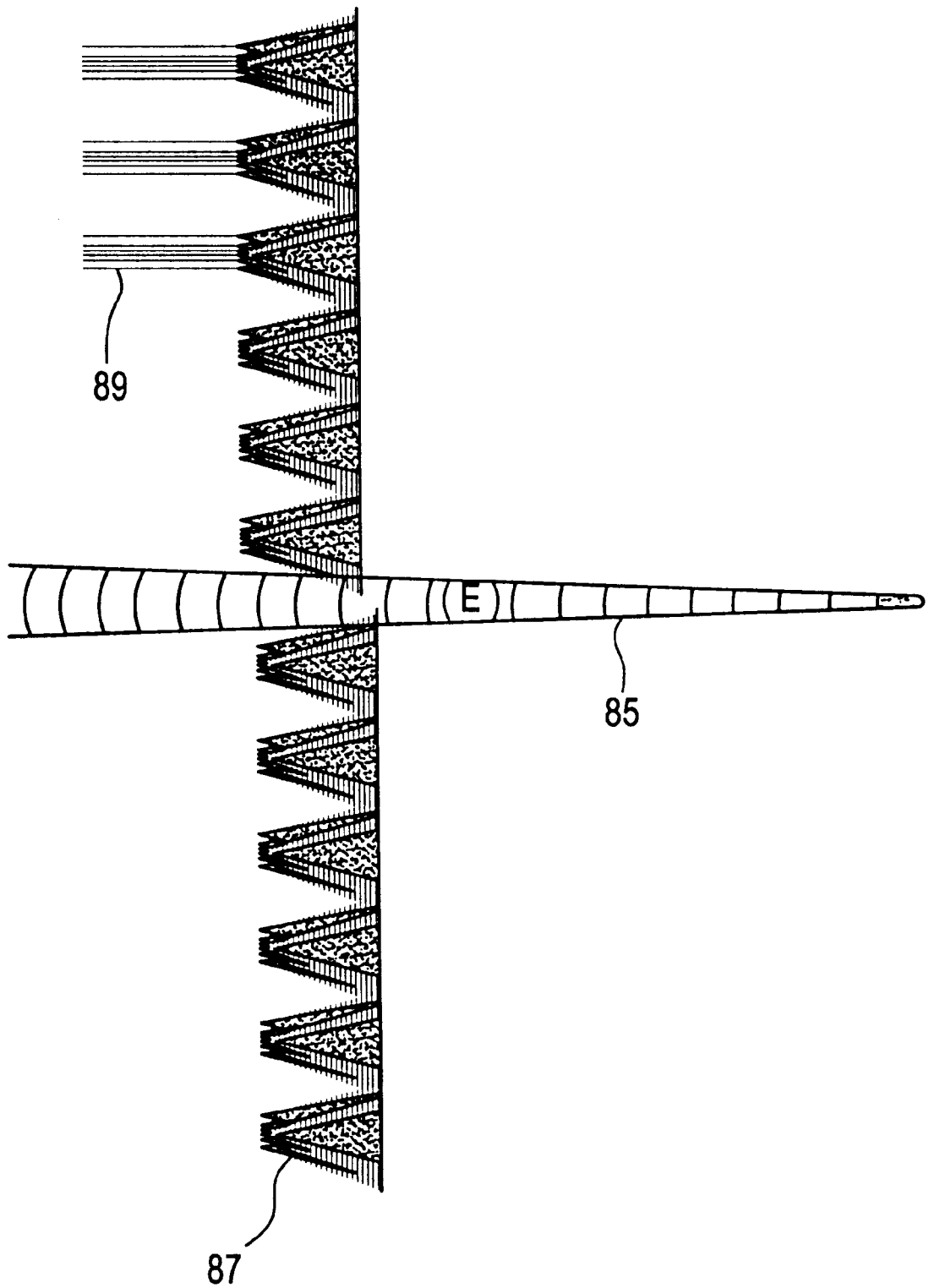
FIG. 20 is a side elevational schematic view of an insulated electrode and antennas connected to waveguides.

FIG. 20 shows multiple horns surrounding an electrode 85, and also shows the multiple wire connections 89 to the multiple horns.

Figure 21:
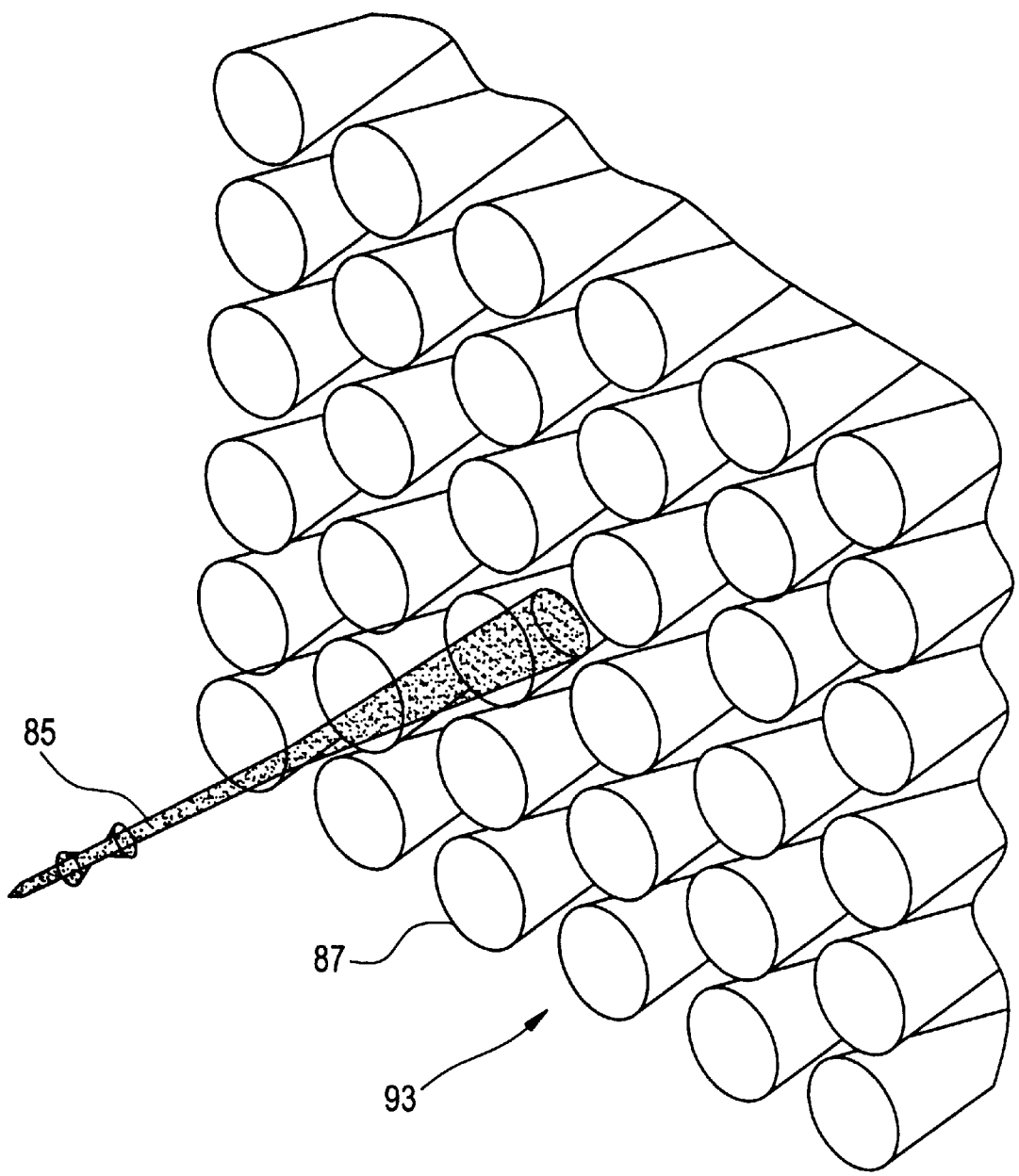
FIG. 21 is a perspective view of an insulated electrode extending from an array of horn antennas.

FIG. 21 is a perspective schematic view of multiple horns 87 in a packed array 93 around a central antenna 85.

Figure 22:
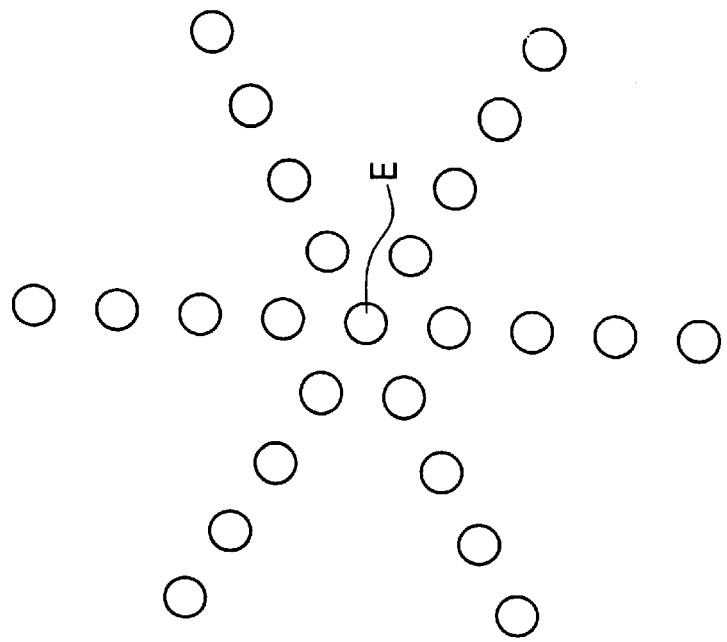
FIG. 22 is an end elevation schematic showing an insulated electrode extending from a center of six radial rows of antennas.

FIG. 22 shows an MFAEPS module 91 with six rows 83 of horns 87 radiating from a central electrode 85.

Figure 23:
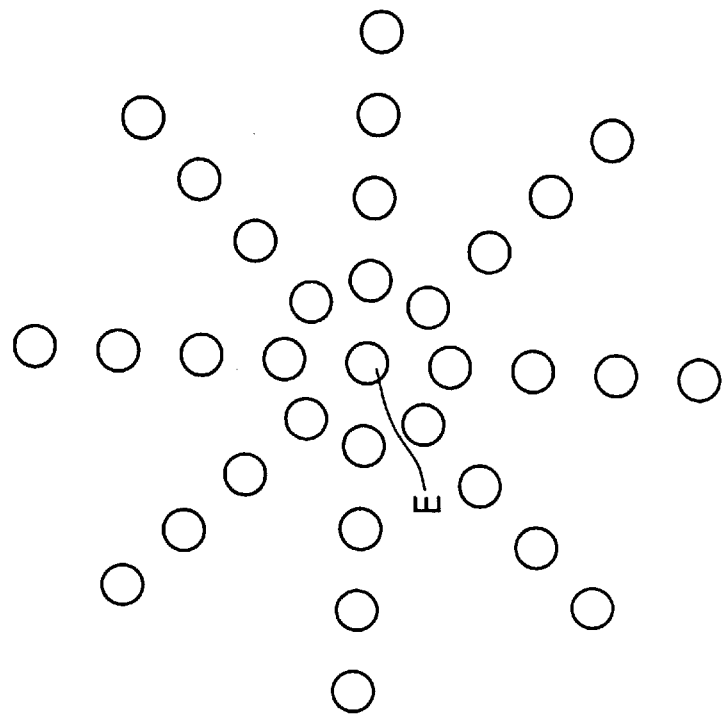
FIG. 23 is an end elevational schematic showing an insulated electrode extending from a center of eight radial rows of antennas.

FIG. 23 shows an MFAEPS module 91 with eight extended rows of horns radiating from a central electrode 85.

Figure 24:
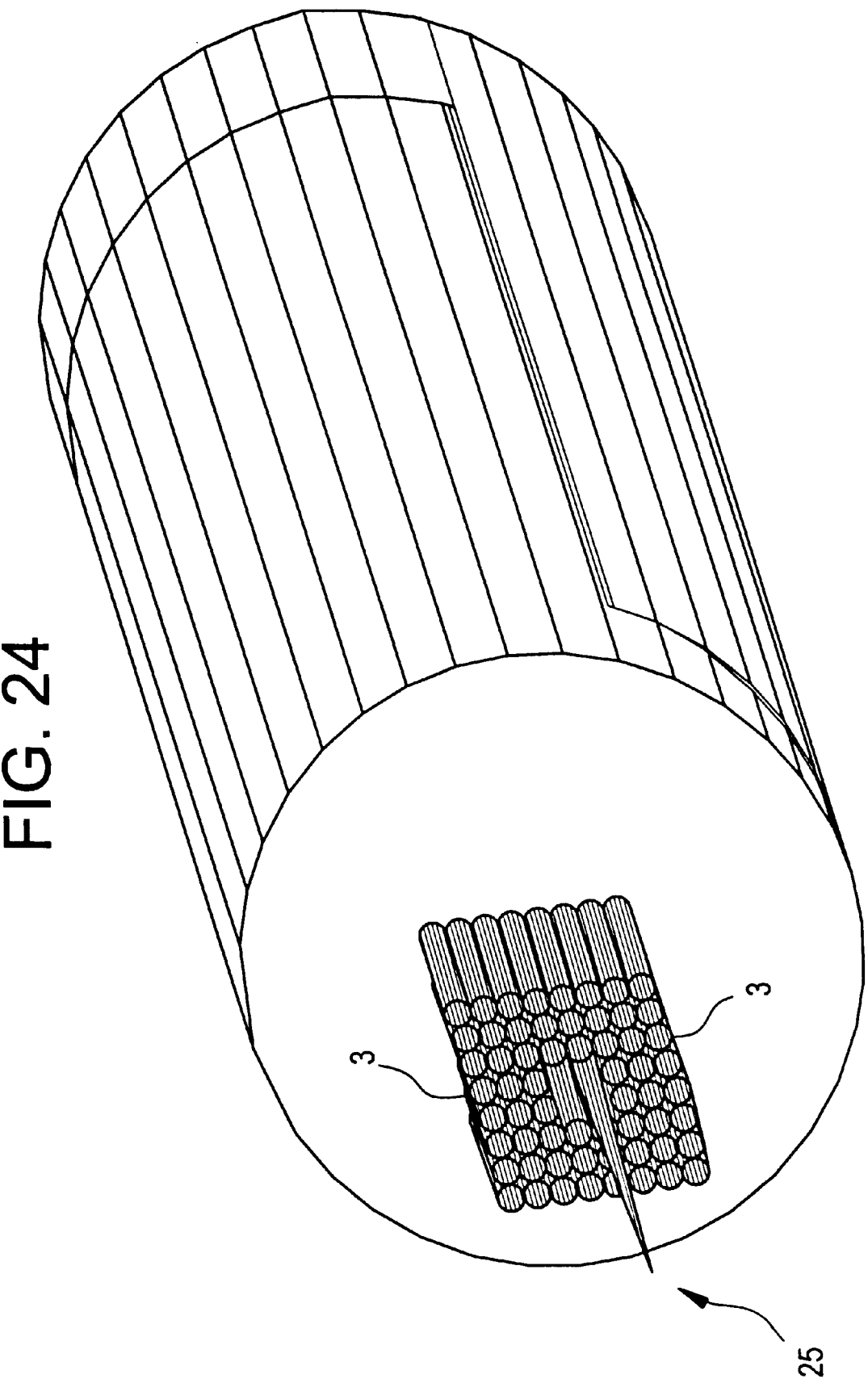
FIG. 24 shows an electrode projecting outward from the center of an array of circular waveguides that project outward from a housing designed to protect connection to power supplies, transmitter, and charge source that MFAEPS requires.

FIG. 24 shows an array of waveguides 3 with a central electrode 25 forming an MFAEPS module 91.

Figure 25:
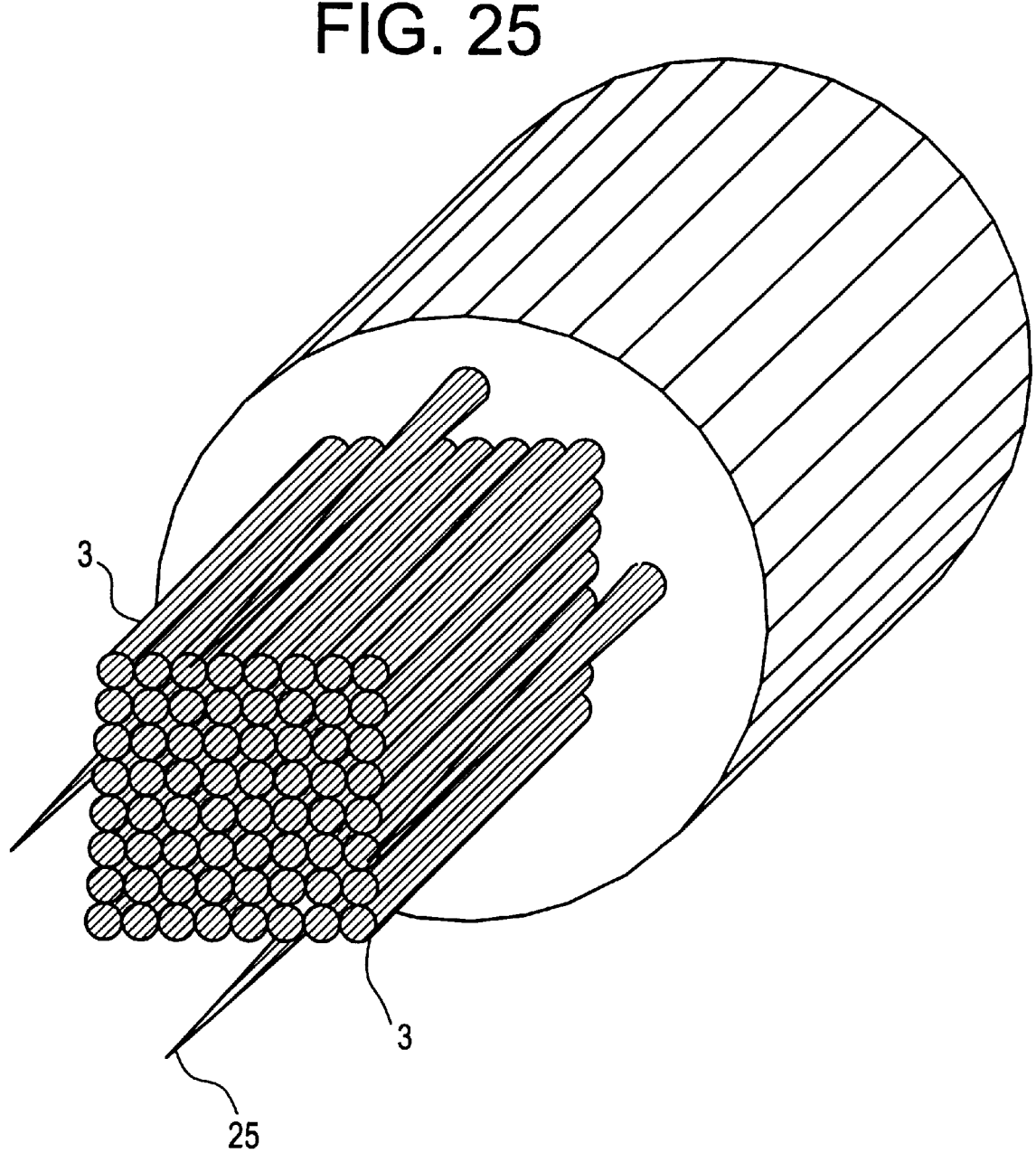
FIG. 25 shows an array of circular waveguides functioning as antenna elements in a phased array. Four electrodes are positioned around the array to either simultaneously release charge into the central beam or to fire one a time to release charge in direction closed to where the beam is scanned to eliminate complexity of a gimbaled electrode that would tilt in the required direction to couple charge release with the excited pathway created by the scanned central beam.

FIG. 25 shows an array of waveguides 3 packed into a phased array with plural electrodes 25 around the border.

While the invention has been described with reference to specific embodiments, modifications and variations of the invention may be constructed without departing from the scope of the invention, which is defined in the following claims.

I claim:

1. A method for projecting energy using microwave radiation comprising generating microwave radiation in a transmitter, receiving and directing the microwave radiation from the transmitter in a waveguide, supplying power to the transmitter, conducting and projecting microwave energy from an antenna connected to the waveguide, exciting and heating gas molecules in a channel extending from the antenna, and releasing a charge into the channel from an electrode.

2. The method of claim 1, further comprising providing a ground positioned near the channel for releasing the charge in the absence of the channel.

3. The method of claim 1, wherein the releasing of microwave radiation is at a frequency of 60 GHz.

4. The method of claim 1, further comprising providing solid state microwave amplifiers in the transmitter.

5. The method of claim 4, further comprising providing gallium arsenide microwave monolithic integrated circuit amplifiers in the transmitter.

6. The method of claim 4, further comprising providing high electron mobility transistor amplifiers in the transmitter.

7. The method of claim 1, further comprising providing tube based sources in the transmitter.

8. The method of claim 7, further comprising providing a gyromonitron oscillator in the transmitter.

9. The method of claim 7, further comprising providing a gyrotron based traveling wave tube amplifier in the transmitter.

10. The method of claim 7, further comprising providing a gyroklystron amplifier in the transmitter.

11. The method of claim 7, further comprising providing an array of klystron amplifiers in the transmitter.

12. The method of claim 7, further comprising providing an array of magnetron amplifiers in the transmitter.

13. The method of claim 1, further comprising positioning a microwave lens between the antenna and the electrode, for reducing divergence of the channel.

14. The method of claim 13, further comprising rotatably positioning the microwave lens for altering charge transmission.

15. The method of claim 1, wherein the antenna is a conical horn antenna having an aperture for connecting the antenna to the waveguide.

16. The method of claim 15, further comprising positioning a transparent window on an outer edge of the conical horn antenna.

17. The method of claim 1, further comprising fitting a cooling jacket around the waveguide and the antenna and externally cooling the system when the waveguide is pressurized.

18. The method of claim 1, further comprising surrounding the waveguide and transmitter by a shield and protecting the system from atmospheric interference.

19. The method of claim 18, further comprising attaching wires to the shield and suspending a microwave lens on struts between the antenna and the electrode.

20. The method of claim 1, further comprising providing the electric charge from a bank of capacitors charged in parallel and discharged serially.

21. The method of claim 1, further comprising providing the electric charge from one of the group comprising modified spark plugs, tesla coils, arc welding nozzles, and banks of charged capacitors.

22. A method for projecting microwave radiation comprising carrying a battery pack, connecting a harness and straps to the battery pack for travel, connecting a transmitter to the battery backpack by a first flexible coaxial cable that carries power from the battery backpack to the transmitter, connecting a waveguide to the transmitter by a second cable, connecting a conical horn antenna to the waveguide, projecting a channel of excited molecules, positioning an electrode in the channel, releasing a charge into the channel, connecting a charge source to the electrode by a third cable and to the battery pack by a second flexible coaxial cable, and holding and carrying the transmitter, waveguide and charge source in a casing.

23. The method of claim 22, further comprising providing induction coils from the battery pack for providing low current and high voltage charge.

24. A method for projecting thermal or electrical energy using microwave radiation comprising generating 60 GHz microwave radiation in a transmitter, connecting a waveguide to the transmitter by a first cable, receiving and directing the microwave radiation from the transmitter in the waveguide, connecting a power supply to the transmitter by a second cable, connecting a conical horn antenna to the waveguide, conducting and projecting a channel of excited, heated air molecules from the antenna projected by the antenna for releasing a charge into the channel from an electrode positioned on the channel, connecting an electric charge source to the electrode by a third cable, delivering the charge to the electrode, providing a ground positioned near the channel, releasing for the charge, and fitting a cooling jacket around the waveguide and the antenna for externally cooling the system when the waveguide is pressurized.

25. A method for projecting energy comprising the steps of generating microwave radiation pulses, projecting the radiation pulses in a channel into air, exciting gas molecules in the channel for energizing the channel into a conductor, and releasing electric charge into the channel.

26. The method of claim 25, further comprising sealing an AEPS and pressurizing a waveguide in an AEPS with inert gases for increasing microwave pulse power.

27. A method for discharging lightning comprising the steps of creating microwave channels by generating microwave radiation pulses, projecting the pulses in channels into air, and exciting gas molecules in the channels for energizing channels into conductors, focusing the channels on a cloud, releasing electrical charge into the channels to further reduce resistance, and directing lightning to an energy accumulator.

28. A method for projecting energy comprising generating microwave radiation pulses in a transmitter for projecting the radiation pulses from antennas in a channel into air, exciting gas molecules in the channel, energizing the channel into a conductor, and releasing electric charge into the channel from an electrode.

29. The method of claim 28, further comprising a waveguide connecting the transmitter and the antenna, and inert gas in the waveguide for pressurizing the waveguide and thereby increasing microwave pulse power.

30. The method of claim 28, further comprising arranging the plural antennas in an array around the electrode.

31. The method of claim 28, further comprising arranging the plural antennas in a circular array around the electrode.

32. The method of claim 28, further comprising arranging plural arrays of antennas and electrodes around a central secure transmission zone.

33. The method of claim 32, further comprising extending the electrodes beyond the antennas.

34. The method of claim 28, further comprising arranging an array of the antennas in rows and columns and positioning the electrode centrally within the rows and columns.

35. The method of claim 28, further comprising arranging the antennas in linear radial arrays and positioning the electrode in a center of the linear radial arrays of antennas.

36. The method of claim 35, further comprising positioning antennas between the radial linear arrays of antennas for uniformly positioning the antennas around the electrode.

37. A method for projecting energy, comprising generating microwave radiation pulses in transmitters, projecting the pulses from antennas in channels into air, creating microwave channels, exciting gas molecules in the channels, energizing channels into conductors, focusing the channels with a lens, directing energy in the channels from an electrode, and accumulating energy for the electrode.

38. The method of claim 37, further comprising discharging lightning through the channel and the electrode.

* * * * *